Aug. 5, 1969   R. F. WINOGROCKI ET AL   3,459,909
VEHICLE DIRECTION SIGNALING APPARATUS WITH ABUTMENT MEANS
RELEASABLY ARRESTING THE APPARATUS
IN AN INTERMEDIATE POSITION
Filed Sept. 18, 1967   3 Sheets-Sheet 1

INVENTORS
RAY F. WINOGROCKI
GERALD L. MC CLURE
BY *Learman & McCulloch*

Aug. 5, 1969  R. F. WINOGROCKI ET AL  3,459,909
VEHICLE DIRECTION SIGNALING APPARATUS WITH ABUTMENT MEANS
RELEASABLY ARRESTING THE APPARATUS
IN AN INTERMEDIATE POSITION
Filed Sept. 18, 1967  3 Sheets-Sheet 2
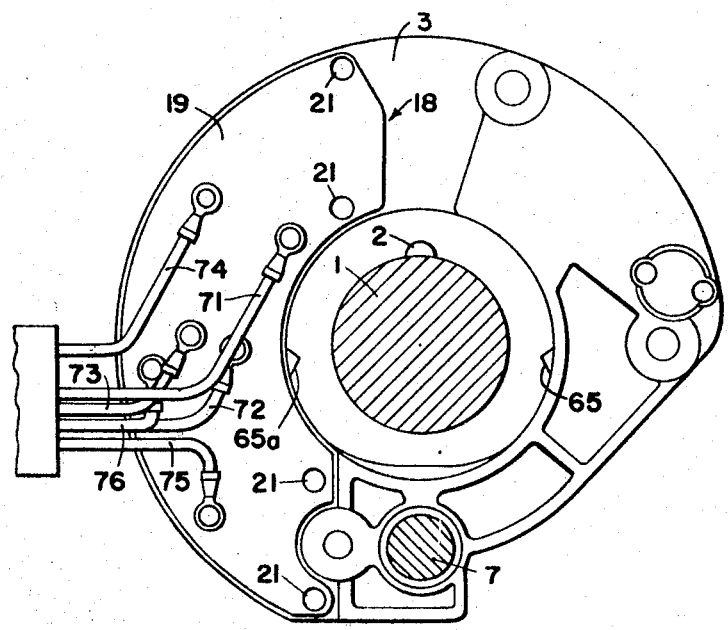
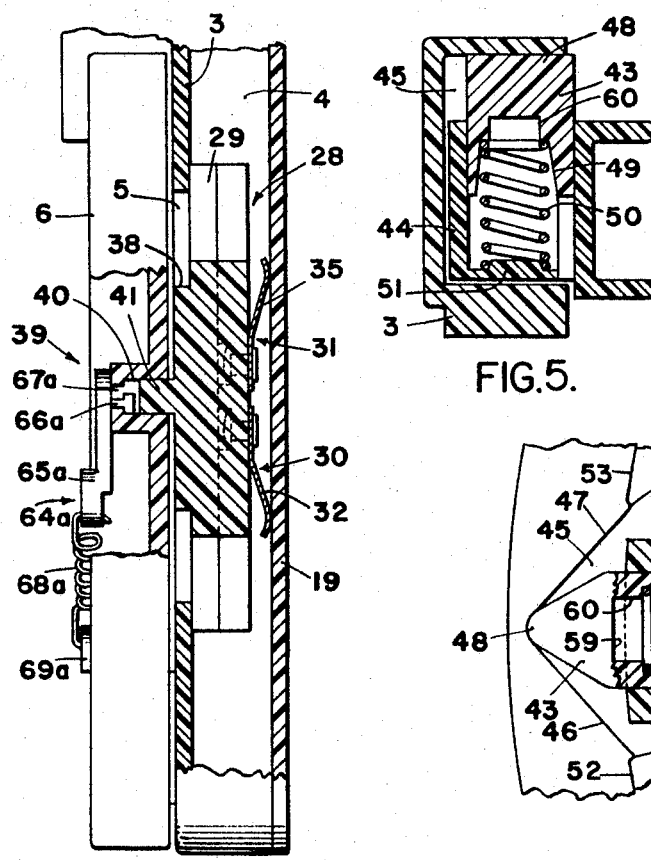
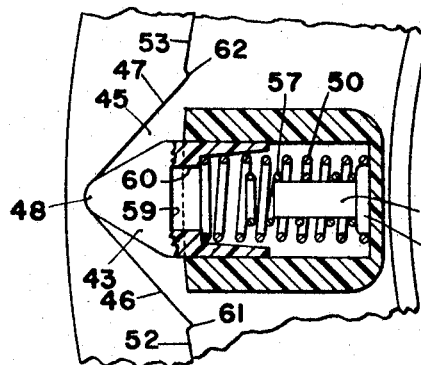
INVENTORS
RAY F. WINOGROCKI
GERALD L. MC CLURE INVENTORS
RAY F WINOGROCKI
GERALD L. MC CLURE
BY Learman & McCulloch

United States Patent Office 3,459,909
Patented Aug. 5, 1969

3,459,909
VEHICLE DIRECTION SIGNALING APPARATUS WITH ABUTMENT MEANS RELEASABLY ARRESTING THE APPARATUS IN AN INTERMEDIATE POSITION
Ray F. Winogrocki, East Detroit, Stephen Brzozowski, Jr., Detroit, and Gerald L. McClure, Warren, Mich., assignors to Essex International, Inc., a corporation of Michigan
Filed Sept. 18, 1967, Ser. No. 668,573
Int. Cl. H01h 3/18
U.S. Cl. 200—61.34    15 Claims

ABSTRACT OF THE DISCLOSURE

A direction signaling apparatus for a vehicle having left and right turn indicators operated by an actuator movable from a neutral position to a left or right operating position and in which a single, reciprocable pawl latches the actuator in its neutral and operating positions, assists in the return of the actuator to its neutral position from either operating position, and is operable to arrest movement of the actuator in an intermediate position between its neutral and operating positions in which the left or right turning indicators are actuated and from which intermediate position the pawl automatically restores the actuator to its neutral position. The turn indicators are connected to fixed contacts forming an integral part of a printed circuit board, and movement of the actuator from neutral toward either of its operating positions causes relative movement of a switching member and the fixed contacts.

---

The invention disclosed herein relates to direction signaling apparatus for a vehicle and more particularly to apparatus wherein the turn signaling indicators are actuated manually and cancelled automatically in response to rotation of the vehicle's steering assembly. Direction signaling apparatus of the general class to which the invention relates conventionally is mounted adjacent the steering column of a vehicle and includes an operating lever by means of which an actuating member may be moved from a neutral position to either of two operating positions in which left-hand or right-hand turn signal indicators may be actuated. The actuating member of such constructions conventionally is returned to its neutral position in response to rotation of the vehicle's steering mechanism following the completion of the turn. Movement of the actuator member effects relative movement of fixed and movable contacts so as to energize and de-energize a selected turn signal circuit.

In recent years the direction signaling apparatus has been required to perform many functions in addition to operating the turn signal indicators. For example, the direction signal actuating mechanism has included apparatus for energizing and de-energizing turning or cornering lamp circuits, head lamp beam control circuits, windshield washer and wiper actuating mechanism circuits, and hazard warning indicator circuits. Safety and convenience items such as those mentioned conveniently may be accommodated in the direction signaling operating mechanism, but in the manufacture of such multiple purpose mechanisms, difficulty is encountered in handling of the wires extending from the fixed and movable contacts of the assembly. Heretofore, a contact and its connecting wire were assembled at one assembly station, and the apparatus moved to another and subsequent assembly stations at each of which additional contacts and wires were assembled. As the number of contacts and wire increases, the difficulty of handling the device also increases, but more importantly, the risk of damaging the connection between the contact and its wires increases. In addition, the time required to assemble the contacts and the wires with the other parts of the apparatus is increased by the necessity of the operator's having to contend with previously installed wires and contacts.

One of the desirable characteristics of a direction signaling device of the character referred to is that the manually operable actuating lever move through only a few degrees from its neutral to either of its operating positions, thereby minimizing the time that must be required to signal a turn and minimizing the possibility that the actuating mechanism will not be moved to its fully latched operating position. Such limited movement of the actuating mechanism, however, may impose severe tolerance conditions on the electrically conductive parts, particularly in those instances in which the direction signaling apparatus includes a lane change position intermediate its neutral and fully latched operating positions and in which it is desired that the turn signal indicator be operative, but that the apparatus be capable of automatic restoration to its neutral position upon release of the operating handle by the vehicle driver. If a lane change position is incorporated in a direction signaling device, the movement of the actuator from its neutral position to its lane change position is even less than that required to effect latching of the actuator in its fully latched position. It is desirable, however, to provide as much movement of the actuator as is possible before the latter reaches its lane change position thereby facilitating the sensing of the vehicle driver that the actuator has been shifted to its lane change position.

An object of this invention is to provide direction signal operating apparatus which minimizes the undesirable characteristics discussed above.

Another object of the invention is to provide a direction signal apparatus in which the fixed contacts and their electrical conductors may be assembled independently of the other parts of the direction signaling apparatus and assembled with the latter as a final step in fabrication of the apparatus so as to avoid the necessity of having to contend with wires at each subassembly stage.

Another object of the invention is to provide direction signaling apparatus having a lane change position and wherein movement of the actuator from its neutral to its operating position requires only a few degrees of movement, but wherein substantially all of the permissible movement of the actuator is effected prior to the arresting of the actuator in its lane change position.

A further object of the invention is to provide direction signaling apparatus having improved means for latching the actuator in turn signal indicating position and having improved means for enabling the vehicle driver to sense adjustment of the actuator to a lane change position.

Other objects and advantages of the invention will be pointed out specifically or will become apparent from the following description when it is considered in conjunction with the appended claims and the accompanying drawings, in which:

FIGURE 3 is a bottom plan view of the apparatus shown in FIGURE 1;

FIGURE 4 is a fragmentary, enlarged, sectional view taken on the line 4—4 of FIGURE 1;

FIGURE 5 is an enlarged sectional view taken on the line 5—5 of FIGURE 1;

FIGURE 6 is a view similar to FIGURE 5, but illustrating a modification of the apparatus;

FIGURE 7 is a fragmenary, partly plan and partly sectional view of the apparatus shown in FIGURE 6 and on a further enlarged scale;

Figure 1:
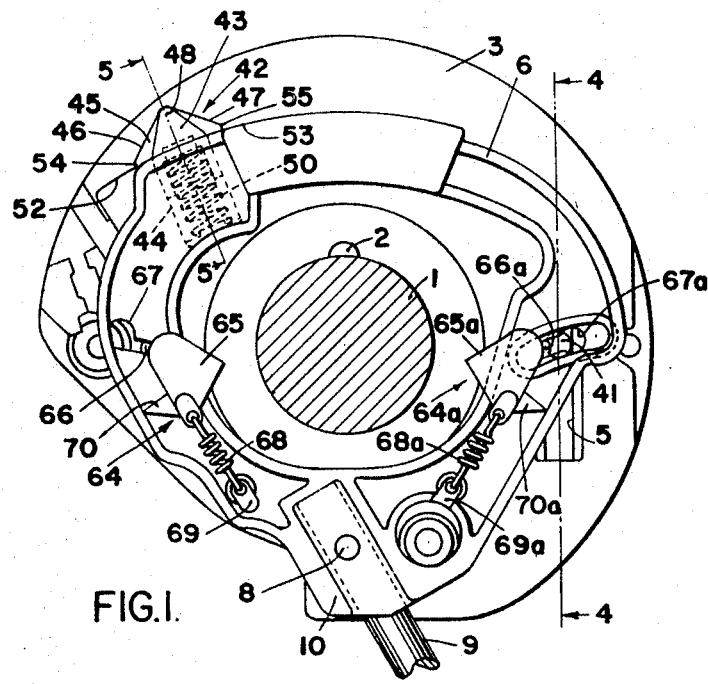
FIGURE 1 is a fragmentary, top plan view of direction signaling apparatus constructed in accordance with the invention and illustrating the actuating mechanism in its neutral position.

Apparatus constructed in accordance with the invention is adapted for use in conjunction with a vehicle having a steering column or housing (not shown) in which is mounted a rotatable steering shaft 1 on which is fixed a cancelling cam 2 for rotation with the shaft. Mounted on the steering column and in a conventional manner so as to surround the shaft 1 is an annular support member 3 formed of a suitable plastic, nonconductive material such as nylon. At one side of the support 3 and in the bottom thereof, is a cavity 4 (FIGURES 2 and 4) in communication with which is a rectangular slot 5.

A generally annular actuating member 6 is pivotally mounted on a pivot post 7 carred by the support 3, the post 7 having a reduced upper end 8 by means of which a manually operable lever 9 is secured in a socket 10 formed in the actuator 6. The arrangement is such that the actuator 6 may be rocked about the axis of the post 7 in either direction from the position shown in FIGURE 1.

A vehicle with which the apparatus is adapated for use conventionally includes a left front signaling lamp 11 (FIGURE 8), a left rear signaling lamp 12, a right front signaling lamp 13 and a right rear signaling lamp 14, all of the lamps being connected in circuit with a source of energy such as a battery 15. Conventionally the rear signaling lamps 12 and 14 function as stop lamps, as well as signaling lamps, and are adapted to be energized upon the closing of a brake pedal actuated switch 16. Also forming part of the circuit is a flasher unit 17 of conventional construction. The function, operation and other details of the electrical circuit will be explained hereinafter.

A fixed contact supporting member 18 is provided for attachment to the support member 3 in underlying relation to the cavity 4 and comprises an arcuate, stiff board 19 formed of insulating material and having a plurality of openings 20 for the reception of rivets 21 (FIGURE 3) by means of which the board is secured to the support 3. Forming an integral part of the board 19 is a plurality of fixed contacts 22, 23, 24, 25, 26 and 27, such contacts being formed in the board 19 by a conventional printed circuit process. Each of the fixed contacts is isolated from one another, but their configuration is such as to enable selected contacts to be bridged by a movable switching device 28 comprising a carrier 29 formed of insulating material accommodated in the cavity 4 and having two conductors 30 and 31 secured thereto in electrically isolated condition. The conductor 30 includes three spring fingers 32, 33 and 34 and the conductor 31 includes three similar fingers 35, 36 and 37. The resiliency of the spring fingers maintains the carrier 29 in engagement with the lower surface of the support 3 and the carrier includes an upstanding rib 38 which is accommodated and guided in the slot 5.

The switching device 28 is adapted to be reciprocated longitudinally of the slot 5 in response to oscillatory movement of the actuator 6 about the axis of the pivot post 7. The means for reciprocating the switching device 28 is designated by the reference character 39 and comprises an arcuate slot 40 formed in the actuator 6 and in which is accommodated an upstanding stud 41 formed on the carrier 29. The construction and arrangement of the reciprocating means 39 are such that, when the actuator 6 is in the neutral position shown in FIGURE 1, the stud 41 occupies a position substantially midway between the ends of the slot 40, and the carrier 29 occupies a position substantially midway between the ends of its reciprocatory path. When the actuator 6 is moved in one direction or the other from its neutral position, however, the wall of its arcuate slot 40 will act on the post 41 so as to shift the carrier 29 in one direction or the other from its center or neutral position. The diameter of the post 41 and the width of the slot 40 correspond substantially in size so as to prevent substantial looseness or "play" of the carrier 29. There is, however, sufficient clearance between the wall of the slot 40 and the post 41 to prevent binding.

Latching means 42 is provided for yieldably holding the actuator 6 in its neutral and operating positions and, in the embodiment shown in FIGURES 1–5, the latching means comprises a spring pressed pawl 43 mounted in a socket 44 carried by and depending from the actuator 6. Also forming part of the latch means 42 is a notch 45 in the support 3 having side walls 46 and 47 which diverge in a direction toward the plunger 43. The socket 44 is so located with respect to the notch 45 that the plunger and notch are located at substantially the same level and confront one another. The plunger 43 has a blunt, conical nose 48 at its outer end and is provided with a bore 49 at its inner end for the reception of one end of a compression spring 50, the opposite end of which seats on the base 51 of the socket 44. The spring 50 constantly exerts a force on the plunger 43 tending to project it outwardly of the socket 44 toward the confronting portion of the support 3.

The walls 46 and 47 of the notch are joined at their terminal ends to flat bearing surfaces 52 and 53 provided on the support 3 on opposite sides of the notch. In the embodiment shown in FIGURES 1 and 2, the side walls 46 and 47 are provided with abutments 54 and 55, respectively, adjacent their terminal ends and which must be traversed by the plunger 42 before it can reach the bearing surfaces 52 and 53. The significance of these abutments will be explained hereinafter.

When the actuator 6 is in the neutral position shown in FIGURE 1, the spring 50, although somewhat compressed, is in a relatively expanded position and maintains the plunger nose 48 pressed firmly against the apex of the notch 45 so as to maintain the actuator 6 in its neutral position. Upon rocking of the actuator toward one or the other of its operating positions, the associated notch wall 46 or 47 will exert a force on the pawl 43, causing the latter to be retracted into the socket 44, compressing the spring 50. When the actuator has been rocked to an operating position, the nose 48 of the pawl 43 will bear on the associated bearing surface 52 or 53 and will be urged forcibly against that bearing surface by the compressed spring 50 with sufficient force as frictionally to latch the actuator in its operating position.

If the abutments 54 and 55 are present on their respective notch walls 46 and 47, their engagement by the pawl 43 arrests further movement of the actuator 6 away from its neutral position and positions the actuator in an intermediate or lane change position between its neutral and fully latched positions. The effect of the abutments 54 and 55 may be overcome, however, by the application of additional force on the operating lever 9.

FIGURES 6 and 7 disclose a modified embodiment of the latch means 42. In this embodiment, the same parts described earlier are utilized and, in addition, a second compression spring 57 is positioned concentrically within the spring 50 and supported on a post 58 which projects from the socket wall 51. The spring 57 is shorter than the spring 50 and is adapted to bear against the base 59 of an extension 60 of the bore 49 when the pawl 43 partially has been retracted from the notch 45. The arrangement is such that, just before the nose 48 of the plunger 43 moves from the notch side wall 46 or 47 to the associated bearing surface 52 or 53, the auxiliary spring 57 will seat on the base 59 and impose additional force on the pawl 43 resisting further retraction thereof. The additional force will arrest the actuator 6 in its intermediate or lane change position, but such force may be overcome by the application of an aditional force on the operating lever 9.

In the embodiment shown in FIGURES 6 and 7, the abutments 54 and 55 may be eliminated inasmuch as the auxiliary spring 57 is operative to arrest the actuator 6 in a lane change position. The springs 50 and 57 also are sufficient to maintain the actuator in either of its fully latched, operating positions in which the pawl nose 48 bears against the respective bearing surfaces 52 and 53. If desired, however, the bearing surfaces 52 and 53 may be provided with abutments 61 and 62, respectively, adjacent their juncture with the notch walls 46 and 47, thereby providing a more positive prevention of inadvertent restoration of the actuator member from an operating position to its neutral position. The abutments 61 and 62 may, if desired, also be included in the embodiment shown in FIGURES 1 and 2.

Means 64 is provided for effecting automatic return of the actuator member 6 from a right turn indicating position and comprises a substantially triangularly shaped finger 65 pivotally mounted by means of a headed stud 66 in a keyhole slot 67 formed in the actuator 6. To one corner of the finger 65 is secured one end of a tension spring 68, the opposite end of which is secured to an anchor 69 provided on the actuator body. The spring 68 normally maintains the finger 65 against an upstanding abutment 70 on the actuator, but the finger is capable of rocking movement counterclockwise from the position shown in FIGURE 1 and also is capable of bodily displacement longitudinally of the slot 67.

Means 64a is provided for effecting automatic restoration of the actuator 6 from a left turn indicating position to its neutral position and is composed of parts similar to the parts of the apparatus 64. Corresponding parts are identified by corresponding reference characters, followed by the suffix a.

Figure 2:
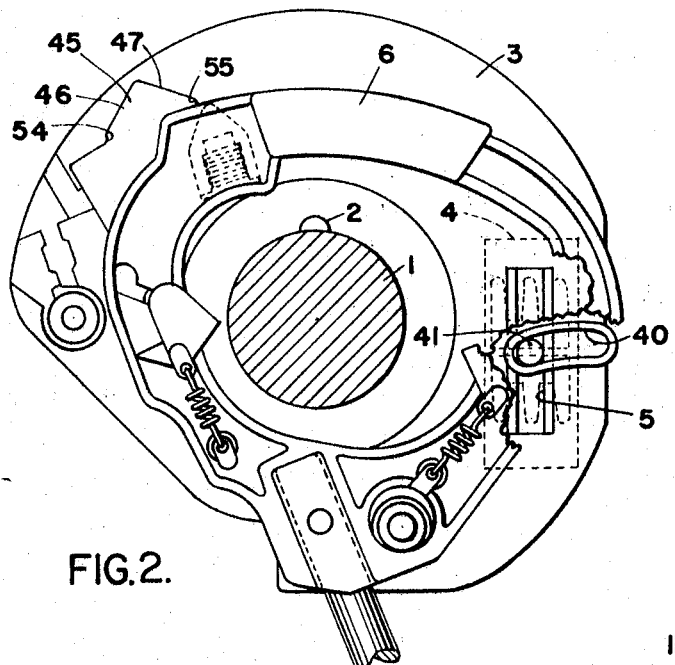
FIGURE 2 is a view similar to FIGURE 1, but illustrating the actuating mechanism in one of its latched, operating positions, certain parts of the apparatus being broken away for clarity of illustration.

When the actuator 6 is is in its neutral position, as shown in FIGURE 1, both of the fingers 65 and 65a are located out of the path of rotation of the cam 2. When the actuator is adjusted to a right turn indicating position, such as is indicated in FIGURE 2, the finger 65 is projected into the path of rotation of the cam 2. Rotation of the steering shaft 1 clockwise to effect a right-hand turn will cause the cam to engage the projected finger 65 and displace the latter pivotally about the axis of the pin 66 and longitudinally of the slot 67 so as to enable the cam 2 to bypass the finger 65 without imposing any appreciable force on the actuator 6. Rotation of the steering shaft counterclockwise, however, will cause the cam 2 to engage the finger 65 and transmit to the abutment 70 a force tending to shift the actuator 6 counterclockwise toward its neutral position. As the actuator is shifted counterclockwise, the pawl nose 48 will leave the bearing surface 53, whereupon the spring 50 will expand and force the pawl into the notch 45, thereby restoring the actuator to its neutral position. The latching means 42 thereby assists in restoration of the actuator to its neutral position and less force is required to restore the actuator to its neutral position than is required to move the actuator from its neutral position to a turn indicating position, inasmuch as the pawl biasing spring or springs expand upon restoration of the actuator to neutral.

If, for some reason, the actuator 6 should be held in its right turn indicating position during counterclockwise rotation of the shaft 1, engagement between the cam 2 and the finger 65 will cause the latter to be displaced longitudinally of the slot 67 a distance sufficient to enable the cam 2 to bypass the return finger, thereby averting the possibility of locking the steering mechanism.

Although the description of the apparatus has been confined to its function in the indicating of a right-hand turn, it will be apparent that it operates in a similar manner for the indicating for the left-hand turn.

When the apparatus is installed on a vehicle in condition for operation, the left front signal lamp 11 will be connected by a conductor 71 to the fixed contact 22, the left rear signal lamp 12 will be connected by a conductor 72 to the fixed contact 23, the right rear signal lamp 14 will be connected by a conductor 73 to the fixed contact 25, the right front signaling lamp 13 will be connected by a conductor 74 to the fixed contact 24, the flasher 17 will be connected between the battery 15 and the fixed contact 27 by a conductor 75 and the fixed contact 26 will be connected through the switch 16 to the battery 15 by a conductor 76. When the actuator 6 is in its neutral position, the switching device 28 will be in the position shown in FIGURE 8 in which both of the contact fingers 32 and 35 engage the fixed contact 26, both of the spring fingers 33 and 34 engage the fixed contact 23 and both of the spring fingers 36 and 37 engage the fixed contact 25. In this position of the actuator member, closing of the switch 16 will connect the rear signal lamps 12 and 14 to the battery 15 via the conductors 72, 73, the spring contacts 30 and 31, the fixed contact 26 and the conductor 76. As long as the switch 16 is maintained closed, the rear lamps 12 and 14 will glow continuously.

Figure 9:
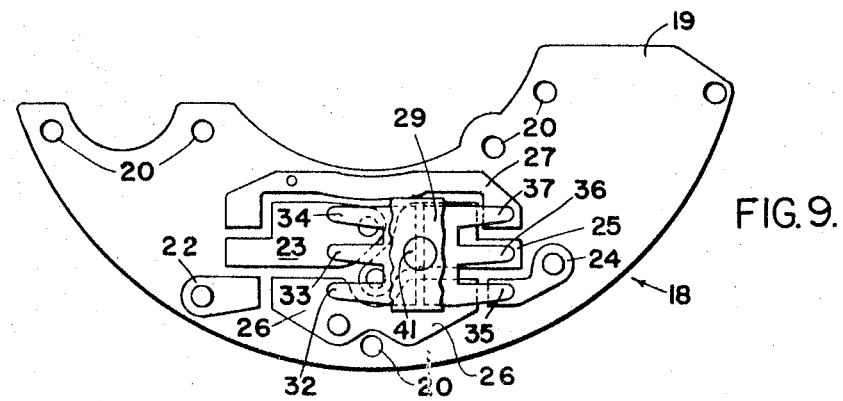
FIGURE 9 is a view similar to FIGURE 8 and illustrating the movable switch member in one turn indicating position.
Figure 8:
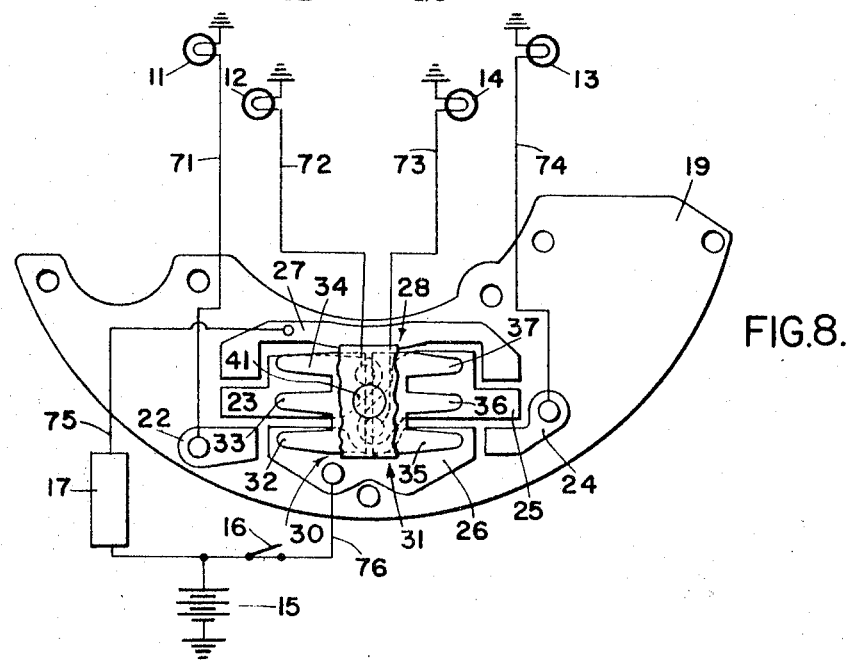
FIGURE 8 is a plan view of the electrical contacts of the apparatus and illustrating the parts in their neutral positions.

When the actuator 6 is shifted clockwise to indicate a right-hand turn, the switching device 28 will move from the position shown in FIGURE 8 to the position shown in FIGURE 9. In this position of the switching device, the spring finger 32 remains in engagement with the fixed contact 26 and the spring fingers 33 and 34 remain in engagement with the fixed contact 23. The spring finger 35, however, disengages the fixed contact 26 and engages the fixed contact 24, the spring finger 36 remains in engagement with the fixed contact 25, and the spring finger 37 disengages the fixed contact 25 and engages the fixed contact 27. The right front lamp 13, therefore, is connected to the battery 15 via the conductor 74, the fixed contact 24, the conductive member 31, the fixed contact 27, the conductor 75 and the flasher 17. The right rear lamp 14 also is connected to the battery 15 via the conductor 73, the conductive member 31, the fixed contacts 25 and 27, the conductor 75 and the flasher 17. The right-hand lamps 13 and 14, therefore, will flash. In the right turn indicating position shown in FIGURE 9, closing of the brake switch 16 will effect steady illumination of the left rear signal lamp 12 in the same manner previously described. Since no part of the conductor 31 engages the fixed contact 26, however, closing of the switch 16 will have no effect on the right rear signal lamp 14.

Figure 10:
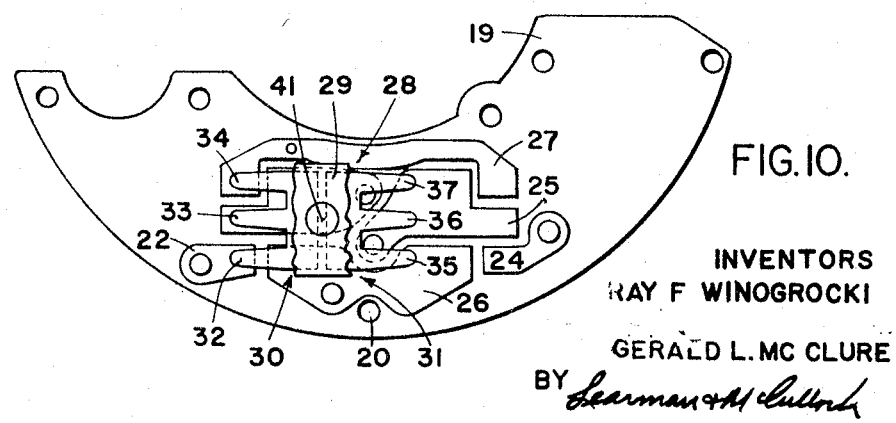
FIGURE 10 is a view similar to FIGURE 9, but illustrating the movable switch member in its other turn indicating position.

When the actuator is shifted to its left turn indicating position, the switching device 28 will move from the position shown in FIGURE 8 to the position shown in FIGURE 10. In this position of the switching device, the left front lamp 11 and the left rear lamp 12 are in circuit with the flasher 17 so that both lamps 11 and 12 flash. The right-hand lamps 13 and 14, however, remain unaffected.

The configuration of the fixed contacts supported on the board 19, the length and arrangement of the spring fingers on the movable conductors 30 and 31, and the extent of rocking movement of the actuator 6 from its neutral position to either of its intermediate or lane change positions are such that in either lane change position, the movable and fixed contacts are in substantially the same relative positions as those shown in FIGURES 9 and 10. Stated differently, the left-hand or right-hand signaling lamps flash when the actuator is in its left-hand or right-hand lane change position.

When the movement of the actuator 6 toward either turn signaling position is interrupted, either by the abutments 54 and 55 or by the auxiliary spring 57, so as to reposition the actuator in its left-hand or right-hand lane change position, the pawl 43 will not have been retracted from the notch 45. Consequently, the spring 50 will bias the pawl to its seated position in the notch so that, upon release of the operating lever 9 by the vehicle driver, the spring 50 automatically will restore the actuator to its neutral position and cancel the flashing of the left or right turn signaling lamps.

In the disclosed construction, the actuator 6 need be rocked only between seven and eight degrees from neutral position to either of its fully latched, turn signal indicating positions. The construction of the latch mechanism 42, however, makes it possible for the actuator to be rocked between five and six degrees from its neutral position to either of its lane change positions. Thus, sufficient movement may be imparted to the actuator to enable the vehicle driver to sense without difficulty the lane change position and without increasing the total throw of the actuator beyond that deemed desirable.

An important characteristic of the invention is that all of the parts constituting the support 3, the actuator 6, the latching means 42 and the cancelling means 64 may be assembled prior to the securing of the fixed contact carrier 18 to the support 3. As a result, the wires 71–76 may be assembled with the fixed contact carrier 18 prior to the assembly of the latter with the support member 3, thereby making it unnecessary for the operator at each assembly station to contend with the wires. This greatly minimizes the likelihood of damaging the connections between the wires and the fixed contacts.

Another advantage of the construction is that none of the wires need be connected to the movable actuator, thereby avoiding the imposition of fatigue forces on the wires during movements of the actuator.

The fixed contact carrier 18 is sufficiently large to enable it to be equipped with many additional fixed contacts for connection to other electrically operated apparatus such as cornering lamps, hazard warning signals, and the like. Such additional apparatus is not disclosed, however, inasmuch as it forms no part of the invention per se.

The disclosed embodiments are representative of presently preferred forms of the invention, but are intended to be illustrative rather than definitive thereof. The invention is defined in the claims.

What is claimed is:

1. Direction signaling apparatus for a vehicle having an electric circuit including selectively operable left hand and right hand indicators for signaling respectively a left hand and a right hand turn, said apparatus comprising a support member; an actuator member; means mounting said actuator member on said support member for oscillatory movement from a neutral position to a selected one of either of two operating positions; a reciprocable pawl carried by one of said members, the other of said members having a notch therein in which said pawl is accommodated when said actuator member is in its neutral position and from which said pawl is withdrawn in response to movement of said actuator member from its neutral position to said one of its operating positions; means in the path of movement of said pawl out of said notch for interrupting movement of said actuator member to said one of said operating positions whereby said actuator member may be located in an intermediate position between said neutral position and said one of said operating position; operating means for moving said actuator member from its neutral position selectively to said intermediate position or to said one of its operating positions; switching means; means mounting said switching means on one of said members for movement in response to movement of said actuator member; means coupling said switching means to other of said members for effecting said movement of said switching means; and a plurality of fixed contacts adapted for connection to said circuit and supported adjacent said switching means in position for engagement with said switching means in response to movement of said actuator member from its neutral position to either said intermediate position or to said one of said operating positions.

2. Apparatus as set forth in claim 1 wherein said fixed contacts are formed integrally with their support.

3. Apparatus as set forth in claim 1 wherein said means in the path of movement of said pawl comprises an abutment carried by said other of said members.

4. Apparatus as set forth in claim 3 wherein said abutment projects into said notch.

5. Apparatus as set forth in claim 1 wherein said means in the path of movement of said pawl comprises a spring.

6. Apparatus as set forth in claim 1 including spring means constantly acting on said pawl and urging the latter in a direction toward said other of said members.

7. Apparatus as set forth in claim 6 wherein said means in the path of movement of said pawl comprises a second spring.

8. Apparatus as set forth in claim 7 wherein said second spring is nested with said spring means.

9. Apparatus as set forth in claim 8 wherein said second spring is shorter than said spring means.

10. Apparatus as set forth in claim 1 wherein said notch has side walls terminating in bearing surfaces on which said pawl may rest when the latter has been withdrawn from said notch.

11. Apparatus as set forth in claim 10 wherein said bearing surfaces are smooth.

12. Apparatus as set forth in claim 10 wherein said bearing surfaces are provided with abutments adjacent the side walls of said notch.

13. Apparatus as set forth in claim 1 wherein the force required to be exerted on said actuator member by said return means to restore the latter from said operating position to said neutral position is less than that required to be exerted on said actuator member to move the latter from said neutral position to said operating position.

14. Apparatus as set forth in claim 1 including biasing means acting on said actuator member for urging the latter toward said neutral position from said intermediate position.

15. Apparatus as set forth in claim 14 wherein said biasing means comprises a spring urging said pawl toward said other member.

References Cited

UNITED STATES PATENTS

| 2,642,505 | 6/1953 | Hept | 200—61.34 |
| 2,800,541 | 7/1957 | Brown et al. | 200—61.34 |

FOREIGN PATENTS

| 69,411 | 11/1958 | France. |
| 604,216 | 4/1960 | Italy. |

ROBERT K. SCHAEFER, Primary Examiner

ROBERT A. VANDERHYE, Assistant Exminer

U.S. Cl. X.R.

200—166